(12) United States Patent
Tajima et al.

(10) Patent No.: US 7,209,827 B2
(45) Date of Patent: Apr. 24, 2007

(54) SERVER APPARATUS, TERMINAL DEVICE, AND INFORMATION PROVIDING SYSTEM

(75) Inventors: Koji Tajima, Tokyo (JP); Naoki Matsumoto, Tokyo (JP); Hiroaki Ban, Tokyo (JP); Kazuhiro Yamada, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 578 days.

(21) Appl. No.: 10/795,127

(22) Filed: Mar. 5, 2004

(65) Prior Publication Data

US 2004/0225712 A1 Nov. 11, 2004

(30) Foreign Application Priority Data

Mar. 7, 2003 (JP) .............................. 2003-062094

(51) Int. Cl.
- G01C 21/26 (2006.01)
- G06F 17/30 (2006.01)
- G06F 15/16 (2006.01)

(52) U.S. Cl. ..................... 701/200; 707/200; 709/201
(58) Field of Classification Search ............... 707/200; 701/200

See application file for complete search history.

(56) References Cited

U.S. PATENT DOCUMENTS 5,802,492 A * 9/1998 DeLorme et al. ......... 455/456.5
6,266,615 B1 * 7/2001 Jin ............................ 701/213

FOREIGN PATENT DOCUMENTS

| EP | 0 795 835 A1 | 9/1997 |
|----|--------------|--------|
| EP | 0795835 * | 9/1997 |
| EP | 1 085 484 A2 | 3/2001 |
| EP | 1 283 509 A2 | 2/2003 |
| JP | H10-160491 A | 6/1998 |
| JP | H11-265495 A | 9/1999 |
| JP | 2002-062154 A | 2/2002 |
| JP | 2002-092785 | 3/2002 |
| JP | 2002-092785 A | 3/2002 |
| JP | 2003-050138 A | 2/2003 |

* cited by examiner

*Primary Examiner*—Don Wong
*Assistant Examiner*—Hung Tran Vy
(74) *Attorney, Agent, or Firm*—Brinks Hofer Gilson & Lione

(57) ABSTRACT

The present invention provides a server apparatus, comprising: storage means for storing a plurality of candidate data including candidate location data and a plurality of attribute data; reception means for receiving search scope indication data, scheduled time data, and present location data, the search scope indication data; extraction means for extracting one attribute data from a plurality of attribute data; calculation means for calculating an expected time of reaching the candidate location on the basis of the present location data and candidate location data corresponding to the extracted attribute data; determination means for determining whether arrival at the candidate location by the expected time is possible, on the basis of the expected time and the scheduled time data; and transmission means for transmitting all or part of the candidate data including the extracted attribute data in a case that the result of the determination by the determination means is negative.

1 Claim, 12 Drawing Sheets

TB1

| LOCATION NAME | LATITUDE | LONGITUDE |
|---|---|---|
| SPA A | N35.xx.xx | E139.yy.yy |
| SPA B | N35.zz.zz | E139.zz.zz |
| SOUVENIR SHOP C | N35.vv.vv | E139.vv.vv |

FIG. 11

| RECORD NUMBER | CANDIDATE LOCATION NAME | ACTIVITY | HOURS | CANDIDATE LOCATION |
|---|---|---|---|---|
| 1 | SPA A | BATH | 10:00~18:00 | N35.xx.xx/E139.yy.yy |
| 2 | SPA B | BATH | 9:30~21:00 | N35.zz.zz/E139.zz.zz |
| 3 | SOUVENIR SHOP C | SHOPPING | 9:00~19:00 | N35vv.vv/E139.vv.vv |

TB2

SERVER APPARATUS, TERMINAL DEVICE, AND INFORMATION PROVIDING SYSTEM

FIELD OF THE INVENTION

The present invention relates to an information providing system for providing information to a terminal device.

RELATED ART

A car navigation device can obtain and display various pieces of information after carrying out wireless communication with a server apparatus. For example, a car navigation device can obtain from a server apparatus, information regarding a place designated as a destination, and can display the information. Furthermore, a car navigation device can calculate the time required to reach the destination and can obtain from a server apparatus, information on the destination in relation to the expected time of arrival. These features are disclosed in Japanese Patent Application Laid-Open Publication No. 2002-92785 (hereinafter referred to as JP 2002-92785A).

According to the system disclosed in JP 2002-92785A, a driver of a vehicle can obtain information regarding a destination, and the obtained information can then be used to determine whether or not an activity scheduled for the expected time of arrival at the destination can be carried out. For example, in a case that the driver on arrival at the destination is scheduled to do shopping at a department store, by obtaining information on the working hours of the department store and on the basis of the information on the arrival time at the destination, the driver can determine whether it is possible to do the shopping as scheduled.

In a case that the driver determines that he/she cannot do the scheduled activity (shopping) at the expected time, the driver can designate a new destination for shopping. In the system disclosed in JP 2002-92785A, when the driver designates a new destination, the expected time of arrival at the new destination is calculated and information regarding the new destination in relation to the expected time of arrival is displayed. If the driver determines that he/she cannot do shopping at the new destination at the expected time, the driver can designate yet another destination. Thus, by the above system, a driver can plan an appropriate schedule on the basis of the obtained information. However, the drawback in this system is that, it is necessary to check information on each destination individually, and in a case that an appropriate destination is not found in the first few attempts, the procedure can become burdensome for the driver.

Therefore, it is necessary to develop a car navigation system that can provide appropriate information without burdening the driver.

SUMMARY OF THE INVENTION

The present invention provides a solution to the above problem. To solve the problem, the present invention provides a server apparatus, comprising: storage means for storing a plurality of candidate data, the candidate data including candidate location data and a plurality of attribute data, the candidate location data showing location information of a candidate location, and each of the plurality of attribute data showing an attribute of the candidate location; reception means for receiving search scope indication data, scheduled time data, and present location data, the search scope indication data showing a scope of search for a plurality of candidate location data; extraction means for extracting one attribute data from a plurality of attribute data, the extracted attribute data being included in the scope of search indicated by the search scope indication data; calculation means for calculating an expected time of reaching the candidate location on the basis of the present location data and candidate location data corresponding to the extracted attribute data; determination means for determining whether arrival at the candidate location by the expected time is possible, on the basis of the expected time and the scheduled time data; and transmission means for transmitting all or part of the candidate data including the extracted attribute data in a case that the result of the determination by the determination means is negative.

The server apparatus allows a system for providing a user necessary information to find an appropriate destination in the instance that a schedule activity cannot be carried out at an originally chosen destination.

In one embodiment of the present invention, the reception means may further receive a search key for identifying the content of the attribute data. The search scope indication data may indicate a category of the attribute data as the scope of search. The extraction means may extract one attribute data which conforms to the search key, from the scope of search.

In another embodiment, the reception means may further receive terminal device location data showing a location of a terminal device which is a source of the scope indication data, the scheduled time data, and the present location data. The scope indication data may indicate the candidate location data as the scope of search. The server apparatus may further comprise area calculation means for calculating area data showing a geographic area including the location of the terminal device. The extraction means may extract one candidate data showing a location which is located in the geographic area shown by the area data, from a plurality of candidate data stored in the storage means.

In another embodiment, the server apparatus may receive the search scope indication data, the scheduled time data, and the present location data, from a terminal device which is capable of measuring its location.

In another embodiment, the server apparatus may further comprise communication means for communicating via a mobile communication network to a communication device which is capable of communicating via the mobile communication network.

The present invention also provides a terminal device capable of obtaining present location data showing a present location of the terminal device, comprising: storage means for storing a plurality of candidate data, the candidate data including candidate location data and a plurality of attribute data, the plurality of candidate location data corresponding to the candidate location data, the candidate location data showing location information of a candidate location, and each of the plurality of attribute data showing an attribute of the candidate location; reception means for receiving destination identification data, scheduled time data, and search scope indication data, the destination identification data identifying a location as a destination, the scheduled time data showing a scheduled time to reach the destination, the search scope indication data showing a scope of search for a plurality of candidate data; first determination means for determining whether or not arrival at the destination by the scheduled time is possible on the basis of the scheduled time data and an expected time of reaching the destination; the expected time of reaching the destination being calculated by using the present location data and candidate location data corresponding to the destination identification data;

extraction means for extracting one attribute data from a plurality of attribute data, the extracted attribute data being included in the scope of search indicated by the search scope indication data; calculation means for calculating an expected time to reach the candidate location on the basis of the present location data and candidate location data corresponding to the extracted attribute data; second determination means for determining whether or not arrival at the candidate location by the expected time is possible, on the basis of the expected time and the scheduled time data; and display means for displaying a screen on the basis of all or part of the candidate data including the extracted attribute data in a case that the result of the determination by the second determination means is negative.

The terminal device allows a system for providing a user necessary information to find an appropriate destination in the instance that a schedule activity cannot be carried out at an originally chosen destination.

The present invention also provides an information provision system having a terminal device and a server apparatus, the terminal device being capable of measuring its location, the server apparatus being capable of communicating with the terminal device, wherein: the terminal device comprises storage means for storing a plurality of destination data, the destination data including destination location data and destination attribute data, the destination location data showing a geographic location of a location, the destination attribute data showing an attribute of the location, the attribute data corresponding to the destination location data; the terminal device further comprises reception means for receiving (a) present location data, (b) destination identification data, (c) scheduled time data, and (d) search scope indication data, the present location data showing a present location of the terminal device, the destination identification data identifying a location as a destination, the scheduled time data showing an expected time of reaching the destination, the search scope indication data indicating a scope of search; the terminal device further comprises first calculation means for calculating an expected time of reaching the destination on the basis of the present location data and the destination location data corresponding to the destination identification data; the terminal device further comprises first determination means for determining whether or not arrival at the destination by the scheduled time is possible, on the basis of the scheduled time data and an expected time of reaching the destination; the terminal device further comprises schedule transmission means for transmitting the search scope indication data, the scheduled time data, and the present location data, to the server apparatus in a case that the result of the determination by the first determination means is negative; the server apparatus comprises storage means for storing a plurality of candidate data, the candidate data including candidate location data and a plurality of attribute data, the candidate location data showing location information of a candidate location, and each of the plurality of attribute data showing an attribute of the candidate location; the server apparatus further comprises reception means for receiving search scope indication data, scheduled time data, and present location data, the search scope indication data showing a scope of search for a plurality of candidate location data; the server apparatus further comprises extraction means for extracting one attribute data from the plurality of attribute data, the extracted attribute data being included in the scope of search indicated by the search scope indication data; the server apparatus further comprises second calculation means for calculating an expected time of reaching the candidate location on the basis of the present location data and candidate location data corresponding to the extracted attribute data; the server apparatus further comprises second determination means for determining whether arrival at the candidate location by the expected time is possible, on the basis of the expected time and the scheduled time data; the server apparatus further comprises transmission means for transmitting all or part of the candidate data including the extracted attribute data in a case that the result of the determination by the determination means is negative; and the terminal device further comprises display means for displaying a screen on the basis of all or a part of the candidate data transmitted by the transmission means. The system allows a user to obtain necessary information to find an appropriate destination in the instance that a schedule activity cannot be carried out at an originally chosen destination.

BRIEF DESCRIPTION OF THE DRAWINGS

One preferred embodiment of the present invention will be described in detail based on the following figures, wherein:

FIG. 11 shows an example of format for candidate location table TB2 stored in storage unit 407 of server apparatus 400;

BEST MODE FOR CARRYING OUT THE INVENTION

Preferred embodiment of the present invention will be described with reference to the figures.

<1. Configuration>
<1-1. General Configuration>

Figure 1:
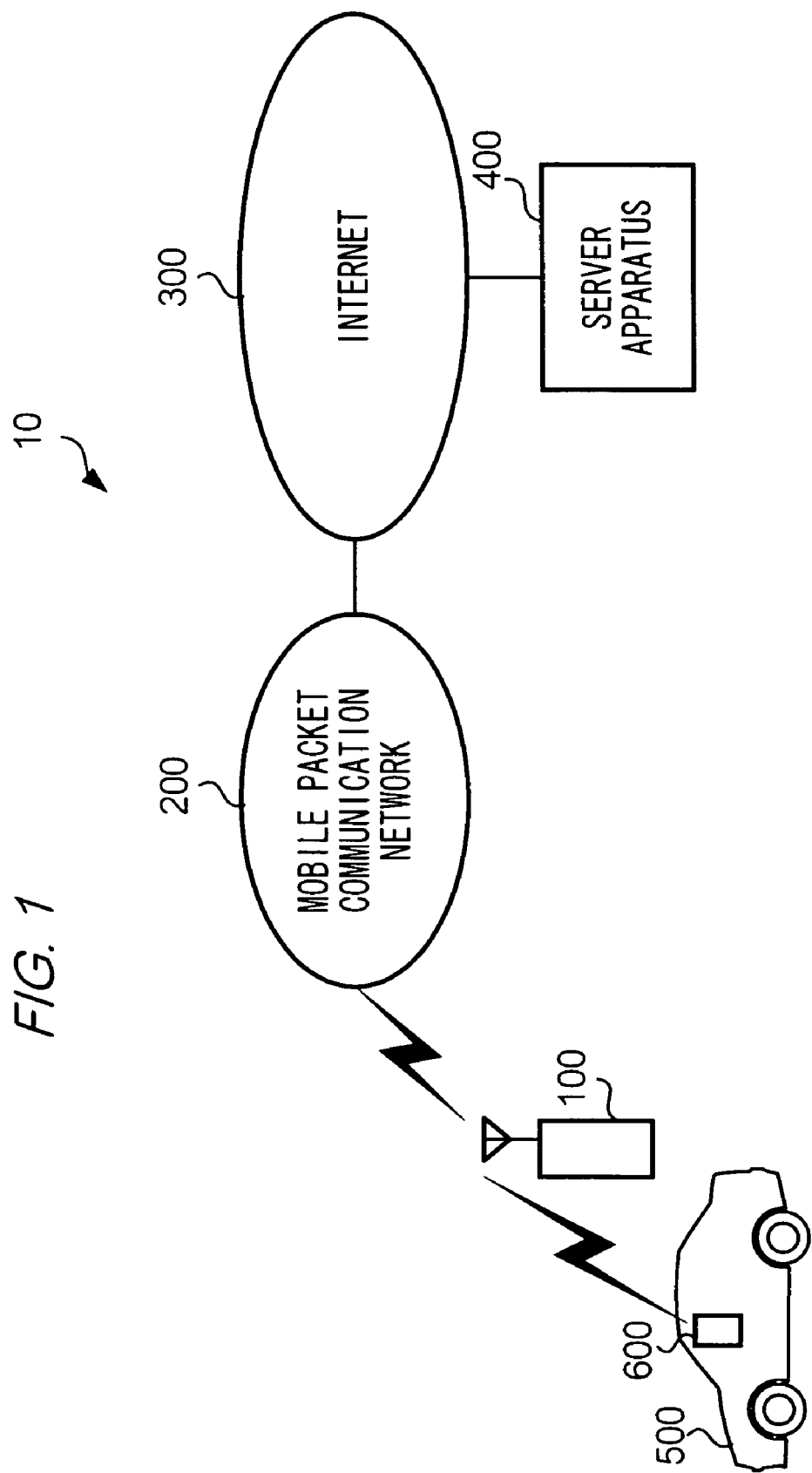
FIG. 1 shows a general configuration of communication system 10 in accordance with one embodiment of the present invention.

FIG. 1 shows a general configuration of communication system 10 in accordance with a preferred embodiment of the present invention. Although communication system 100 comprises a plurality of mobile communication terminals, server apparatuses, cars, and car navigation devices, only one of each of these elements, namely, mobile communication terminal 100, server apparatus 100, car 500, and car navigation device 600 are shown in FIG. 1 for reason of clarity and simplification of the drawing.

Mobile packet communication network 200 is a communication network for providing data communication service to users who make a subscription contract with the carrier operating mobile packet communication network 200. Mobile packet communication network 200 comprises wireless base stations for communicating with mobile communication terminal 100, switches, Internet 300, and gateway server apparatus for connecting Internet 300 and mobile packet communication network 300 (all of which are not shown in the figures), and relays data for packet communication between mobile communication terminal 100 and server apparatus 400 which is connected to Internet 300. Mobile packet communication network 200 dynamically allocates an IP (Internet Protocol) address to mobile communication terminal 100 and transmits the allocated IP address to mobile communication terminal 100 when mobile communication terminal 100 performs packet communication.

Mobile communication terminal 100 is a mobile phone capable of carrying out packet communication with server apparatus 400 via mobile packet communication network 200 and Internet 300 by using the IP address allocated by mobile packet communication network 200. Mobile communication terminal 100 comprises a communication interface conforming to the Bluetooth standard which is one of short range wireless communication standards, and is capable of communicating with other devices comprising a communication interface conforming to the Bluetooth standard.

Server apparatus 400 is a communication apparatus for information providing services. In the embodiment, server apparatus 400 provides information, for example, regarding locations, stores, and spots, in response to a message transmitted from car navigation device 600 via mobile communication terminal 100.

Car navigation device 600 is a device comprising functions for displaying, for example, a map, a route to a destination, and an expected time of arrival at the destination the same as a conventional car navigation device. In the embodiment, car navigation device 600 comprises a communication interface conforming to the Bluetooth standard, and is capable of communicating with mobile communication terminal 100 in conformity with the Bluetooth standard.

<1-2. Functional Configuration of Car Navigation Device 600 and Server Apparatus 400>

Figure 16:
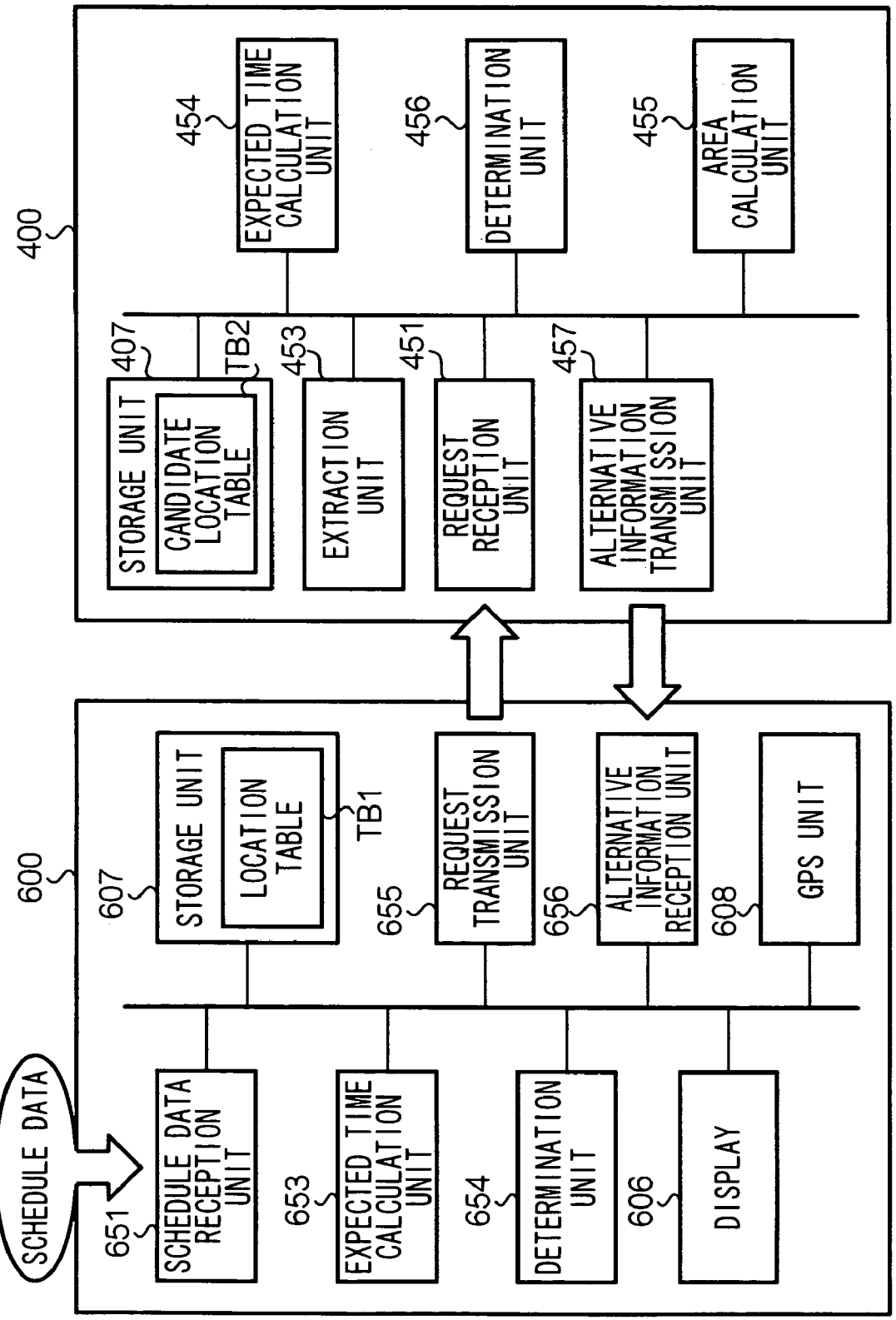
FIG. 16 is a block diagram illustrating a functional configuration of car navigation device 600 and server apparatus 400 in accordance with the embodiment.

FIG. 16 is a block diagram illustrating a functional configuration of car navigation device 600 and server apparatus 400 in accordance with the embodiment. In car navigation device 600, GPS unit 608 can measure its location as described in detail later. Schedule data reception unit 651 receives data (for example, destination data, activity data, scheduled time data, alternative category data) from mobile communication terminal 100. Storage unit 607 stores location table TB1 which has a plurality of data sets, each data set comprising data showing name, latitude, and longitude of a location. Expected time calculation unit 653 calculates an expected time of arrival at the destination, on the basis of the data received from mobile communication terminal 100 and the data recorded in location table TB1. Determination unit 654 determines whether the expected time of reaching the destination is later than the scheduled time, on the basis of the scheduled time data and the expected time of arrival at the destination. If the result of the determination is positive, request transmission unit 655 transmits a message for requesting server apparatus 400 to provide information regarding an alternative destination.

In server apparatus 400, request reception unit 451 receives a message from car navigation device 600. Storage unit 407 stores candidate location table TB2 which will be described in detail later. Area calculation unit 455 calculates an area which is defined by the present location of car navigation device 600. Extraction unit 453 extracts a candidate location by searching candidate location table TB2, on the basis of the data included in the received data. Expected time calculation unit 454 calculates an expected time of reaching the candidate location, on the basis of the location data corresponding to the candidate location and the data included in the received data. Determination unit 456 determines whether the expected time of reaching the candidate location is later than the scheduled time, on the basis of the scheduled time data and the expected time of reaching at the candidate location. Alternative information transmission unit 457 transmits to car navigation device, data showing information regarding the candidate location (alternative destination), on the basis of the determination result by determination unit 456.

Again in car navigation unit 600, alternative information reception unit 656 receives from server apparatus 400, data showing information regarding the candidate location. Display 606 displays information on the basis of the received data. Thus, a user (driver) of a vehicle can obtain necessary information to find an appropriate destination in the instance that a schedule activity cannot be carried out at an originally chosen destination. Although all of the function of the system is achieved by software as described in the embodiment below, the system may be achieved by a combination of hardware.

<1-3. Configuration of Mobile Communication Terminal 100>

Figure 2:
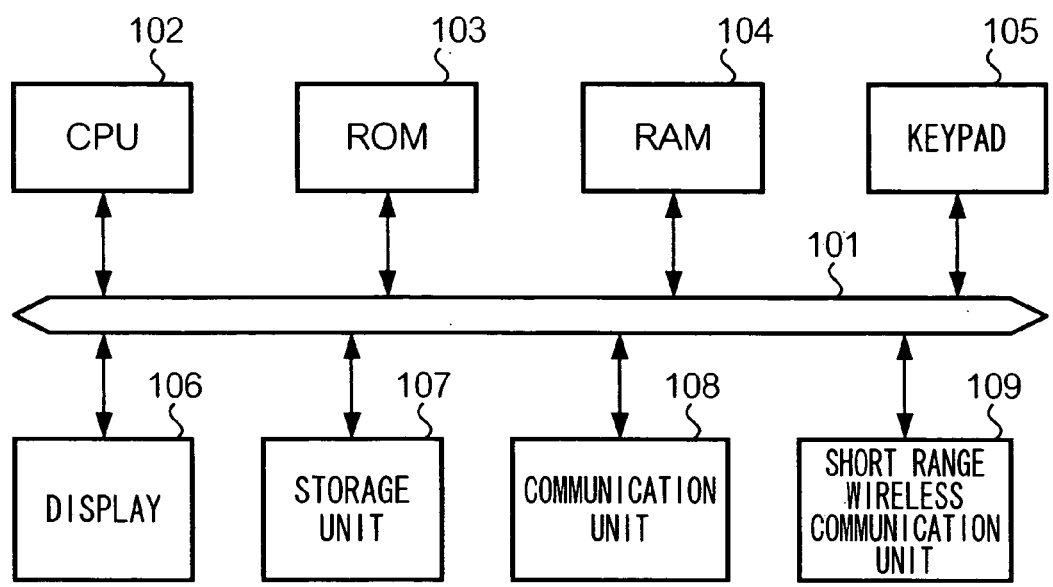
FIG. 2 is a block diagram illustrating a hardware configuration of mobile communication terminal 100 in accordance with the embodiment.

FIG. 2 is a block diagram illustrating a hardware configuration of mobile communication terminal 100 in accordance with the embodiment. Each of the units belonging to mobile communication terminal 100, transmits/receives data between each other, via bus 101.

Communication unit 108 functions as a communication interface, and performs wireless communication with a wireless base station in mobile packet communication network 200 via an antenna (not shown in the figures) under the control of CPU (Central Processing Unit) 102. Communication unit 108 transmits to CPU 102 packet data received from the wireless base station, and transmits to the wireless base station, packet data outputted from CPU 102.

Short range wireless communication unit 109 functions as a communication interface conforming to the Bluetooth standard. Short range wireless communication unit 109 transmits a received signal to CPU 102, and transmits the signal received from CPU 102 after changing the signal to conform to the Bluetooth standard. Keypad 105 comprises a plurality of keys (not shown in the figures) for operating mobile communication terminal 100. When a user operates one of the keys, keypad 105 transmits to CPU 102 a signal corresponding to the operated key. Display 105 displays characters, images, and menus for operating mobile communication terminal 100 under the control of CPU 102.

Storage unit 107 comprises a nonvolatile memory such as EEPROM (Electrically Erasable Programmable Read Only Memory), and stores data for controlling mobile communication terminal 100 and schedule registration application. The schedule registration application will be described in detail later.

ROM (Read Only Memory) 103 stores an operating system software for controlling all the units of mobile communication terminal 100. When power is supplied from a power supply (not shown in the figures), CPU 102 reads the operating system from ROM 103 and initiates the operating system for controlling all the units of mobile communication terminal 100, using RAM (Random Access Memory) 104 as a work area. Thus, mobile communication terminal 100 comprises units similar to a conventional computer device.

After initiating the operating system, CPU 102 performs various operations in response to a signal inputted into CPU 102. For example, when a user of mobile communication terminal 100 operates a key of keypad 105 for initiating the schedule registration application, CPU 102 identifies the instruction on the basis of the signal from keypad 105 and the information displayed on display 106. Then, CPU 102 reads and initiates the schedule registration application from storage unit 107.

Figure 3:
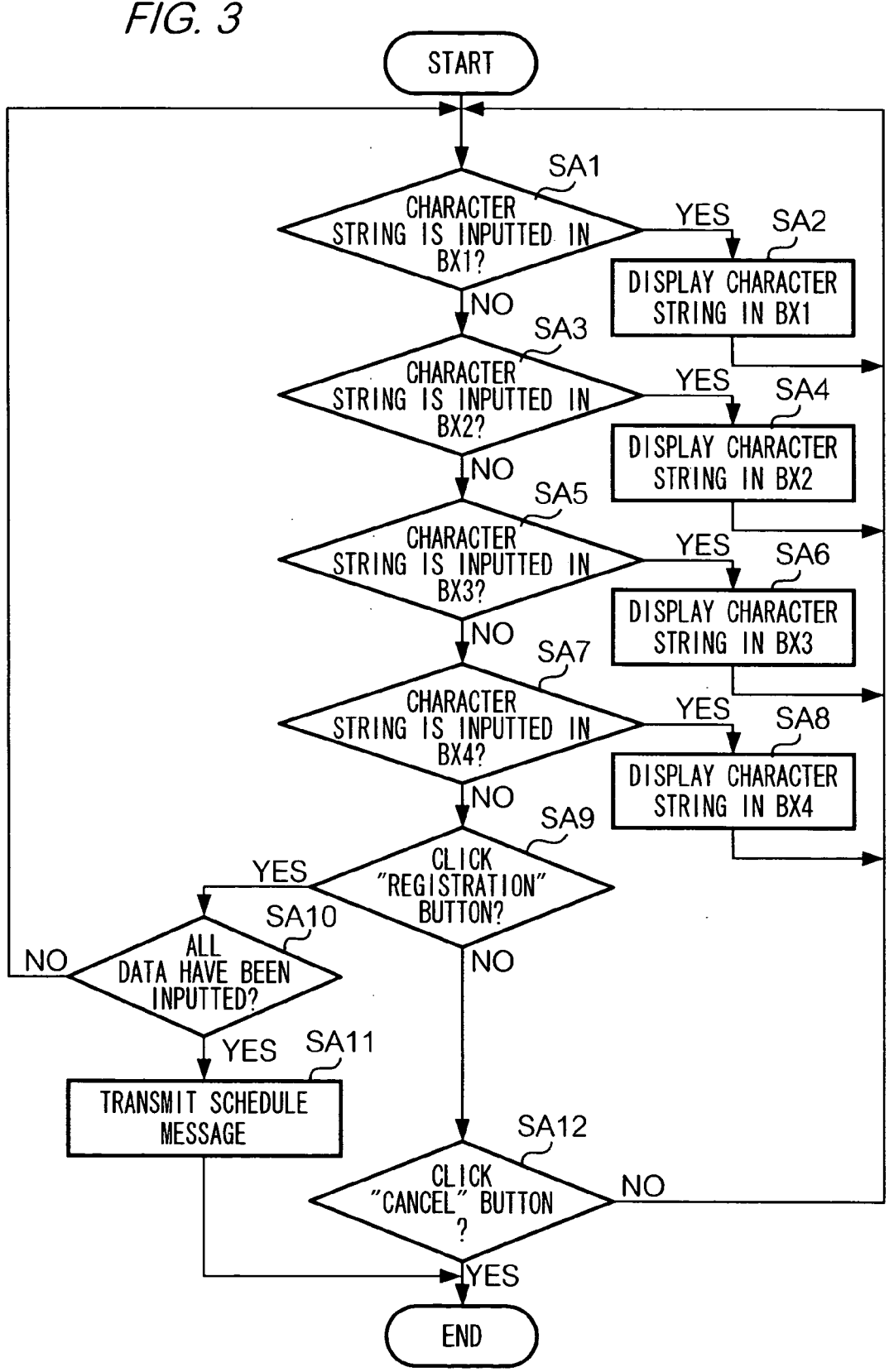
FIG. 3 is a flow chart illustrating an operation of CPU 102 when transmitting a schedule message to car navigation device 600.

When the schedule registration application is executed by CPU 102, mobile communication terminal 100 can transmit data showing a schedule of the user to car navigation device 600. FIG. 3 is a flow chart illustrating an operation of CPU 102 when transmitting data showing a schedule of the user to car navigation device 600.

Figure 4:
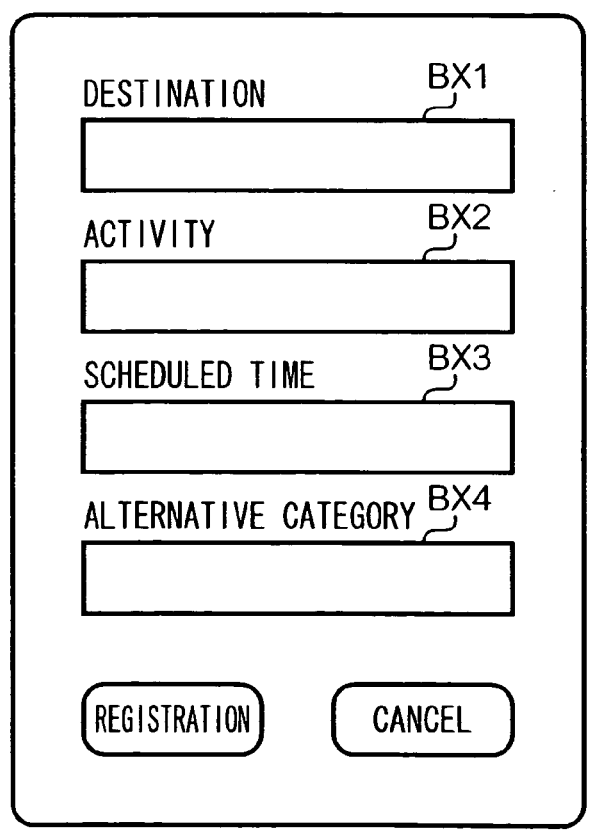
FIG. 4 shows an example of a screen displayed when CPU 102 of mobile communication terminal 100 initiates a schedule registration application.

When the schedule registration application is initiated by CPU 102, the screen as shown in FIG. 4 is displayed on display 106 under the control of CPU 102. When the user of mobile communication terminal 100 operates keys of keypad 105 for selecting one of text boxes BX1–BX4 shown in FIG. 4 and for inputting character strings, the inputted character strings are displayed in the corresponding text box (steps SA2, SA4, SA6, and SA8).

When the user of mobile communication terminal 100 operates keys of keypad 105 as in clicking "registration button" displayed on display 106 (step SA9: YES), CPU 102 determines whether all of the text boxes displayed on display 106 are filled with character strings (step SA10). If the results of the determination is positive (step SA10: YES), CPU 102 extracts the character strings inputted in the text boxes.

The character string extracted from text box BX1 corresponds to a destination to which the user is scheduled to go, and the character string is stored in RAM 104 as "destination data". The character string extracted from text box BX2 corresponds to an activity which the user is scheduled to do at the destination, and the character string is stored in RAM 104 as "activity data". The character string extracted from text box BX3 corresponds to a scheduled time for the user to reach the destination, and is stored in RAM 104 as "scheduled time data". The character string extracted from text box BX4 corresponds to a category of alternative information, which the user wants to obtain from server apparatus 400 when the schedule corresponding to the character strings in text boxes BX1–BX3 is cancelled, and is stored in RAM 104 as "alternative category data".

Then, CPU 102 generates a schedule message which includes the destination data, the activity data, the scheduled time data, and the alternative category data, all of which are stored in RAM 104. CPU 102 transmits the schedule message to car navigation device 600 via short range wireless communication unit 109 (step SA11).

Figure 5:
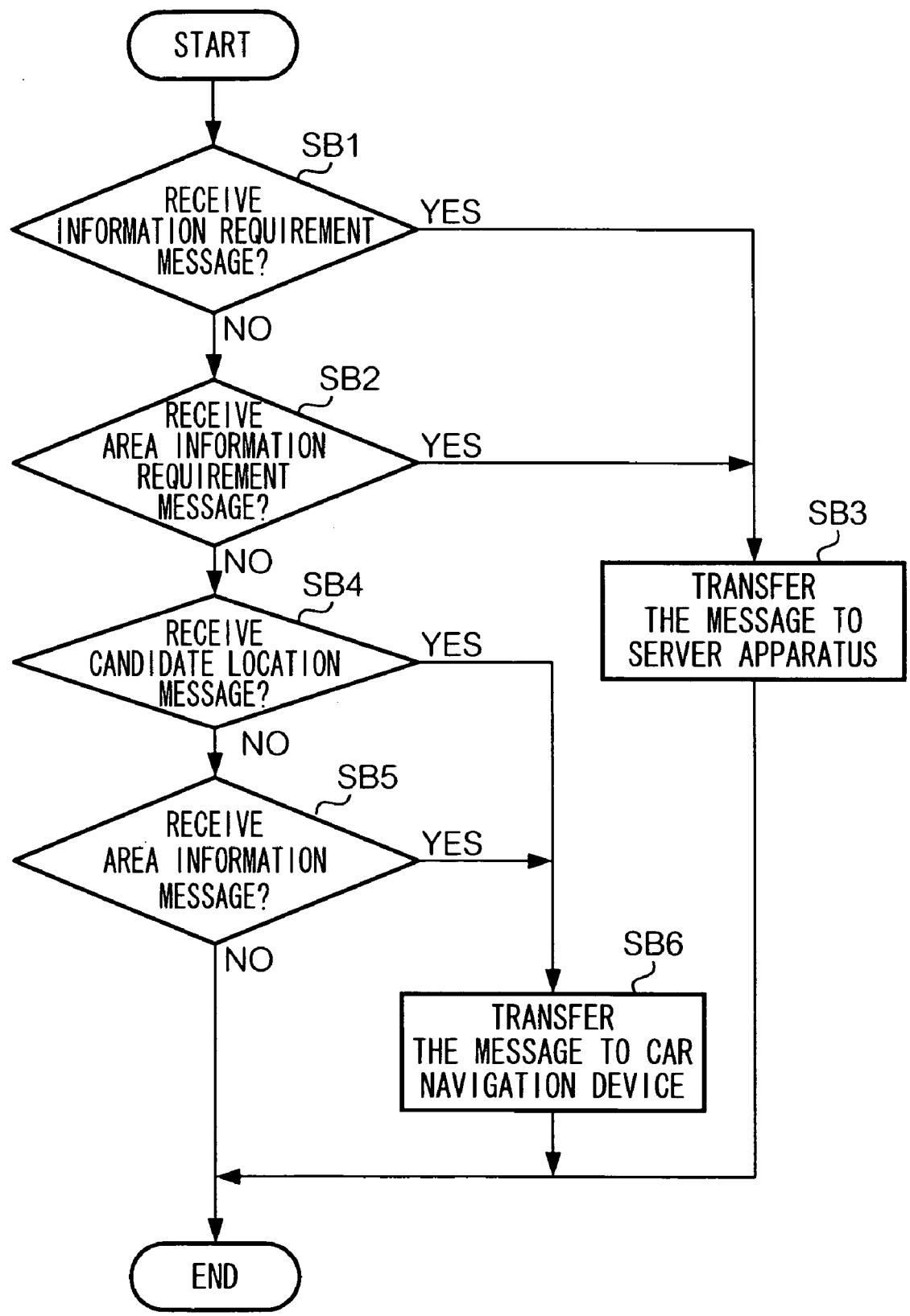
FIG. 5 is a flow chart illustrating an operation of CPU 102 when receiving a message.

When the schedule registration application is executed by CPU 102, mobile communication terminal 100 can transmit a message from car navigation device 600 to server apparatus 400 and can transmit a message from server apparatus 400 to car navigation device 600. FIG. 5 is a flow chart illustrating an operation of CPU 102 when transmitting/receiving a message.

When CPU 102 receives a message, CPU 102 determines the category of the received message and transmits the message to a different destination, which is selected on the basis of the category of the message. In either case, of the received message being an information requirement message, or that of an area information requirement message (step SB1: YES, or step SB2: YES), CPU 102 transmits the message including the IP address, to server apparatus 400, via communication unit 108 (step SB3). In either case, of the received message being a candidate location message, or that of an area information message (step SB4: YES, or step SB5: YES), CPU 102 transmits the message to car navigation device 600 via short range wireless communication unit 109 (step SB6).

<1-4. Configuration of Car Navigation Device 600>

Figures 6, 7:
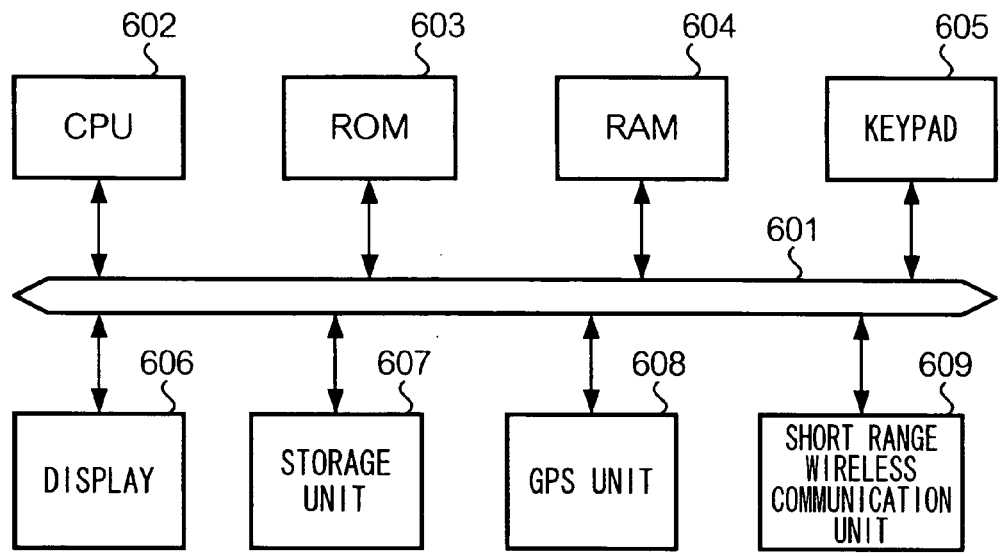
FIG. 6 is a block diagram illustrating a hardware configuration of car navigation device 600 in accordance with the embodiment.
FIG. 7 shows an example of a format for location table TB1 stored in storage unit 607 of car navigation device 600.

FIG. 6 is a block diagram illustrating a hardware configuration of car navigation device 600 in accordance with the embodiment. Each of the units belonging to car navigation device 600 transmits/receives data between each other, via bus 601.

GPS (Global Positioning System) unit 608 is a unit for measuring its location by using GPS satellites. When GPS unit 608 receives electric waves for location measurement emitted from a plurality of GPS satellites, GPS unit 608 calculates the latitude and the longitude of the present position of car navigation device 600, on the basis of the phase difference between the received electric waves. GPS unit 608 transmits to CPU 602, latitude data and longitude data showing the calculated latitude and longitude.

Short range wireless communication unit 609 functions as a communication interface conforming to the Bluetooth standard. Short range wireless communication unit 609 transmits a received signal to CPU 602, and transmits the signal received from CPU 102 after changing the signal to conform to the Bluetooth standard.

When a user operates one of the keys, keypad 605 transmits to CPU 602 a signal corresponding to the operated key. Display 606 displays characters, images, and menus for operating car navigation device 600 under the control of CPU 602.

Storage unit 607 comprises a storage device for durably storing data, such as a hard disk drive (not shown in the figures), and stores application software such as a schedule application, or a car navigation application, which will be described in detail later. Storage unit 607 also stores data used for the schedule application, or the car navigation application. Furthermore, storage unit 607 stores location table TB1 which has a plurality of data sets, each data set comprising data showing name, latitude, and longitude of a location. FIG. 7 shows an example of a format for location table TB1. The character string corresponding to a location name is recorded in location name field. The character strings corresponding to the latitude and the longitude of the location identified by the location name, are recorded in latitude field and longitude field, respectively. For example, if the latitude of the location is 35 degrees xx minutes xx seconds north latitude and 139 degrees yy minutes yy seconds east longitude, "N35.xx.xx" and "E139.yy.yy" are recorded in the latitude field and the longitude field, respectively.

ROM 603 stores an operating system software for controlling all of the units of car navigation device 600. When power is supplied from a power supply (not shown in the figures), CPU 602 reads the operating system from ROM 603 and initiates the Operating system for controlling all of the units of car navigation device 600, by using RAM 604 as a work area. After initiating the operating system, CPU 602 reads and initiates the car navigation application and the schedule application from storage unit 607. Thus, car navigation device 600 has a similar configuration to a conventional computer device, in that, car navigation device 600 comprises a plurality of units, which are under the control of CPU, through which the navigation device performs various functions in accordance with an application read from ROM.

After initiating the operating system, CPU 602 can keep time and stores time data in RAM 604, for example, at every second.

When CPU 602 executes the car navigation application, car navigation device 600 can perform conventional car navigation operation such as displaying a map and a route to a destination, calculating an expected time of arrival at a destination, or calculating the average speed of car 500.

Figure 8:
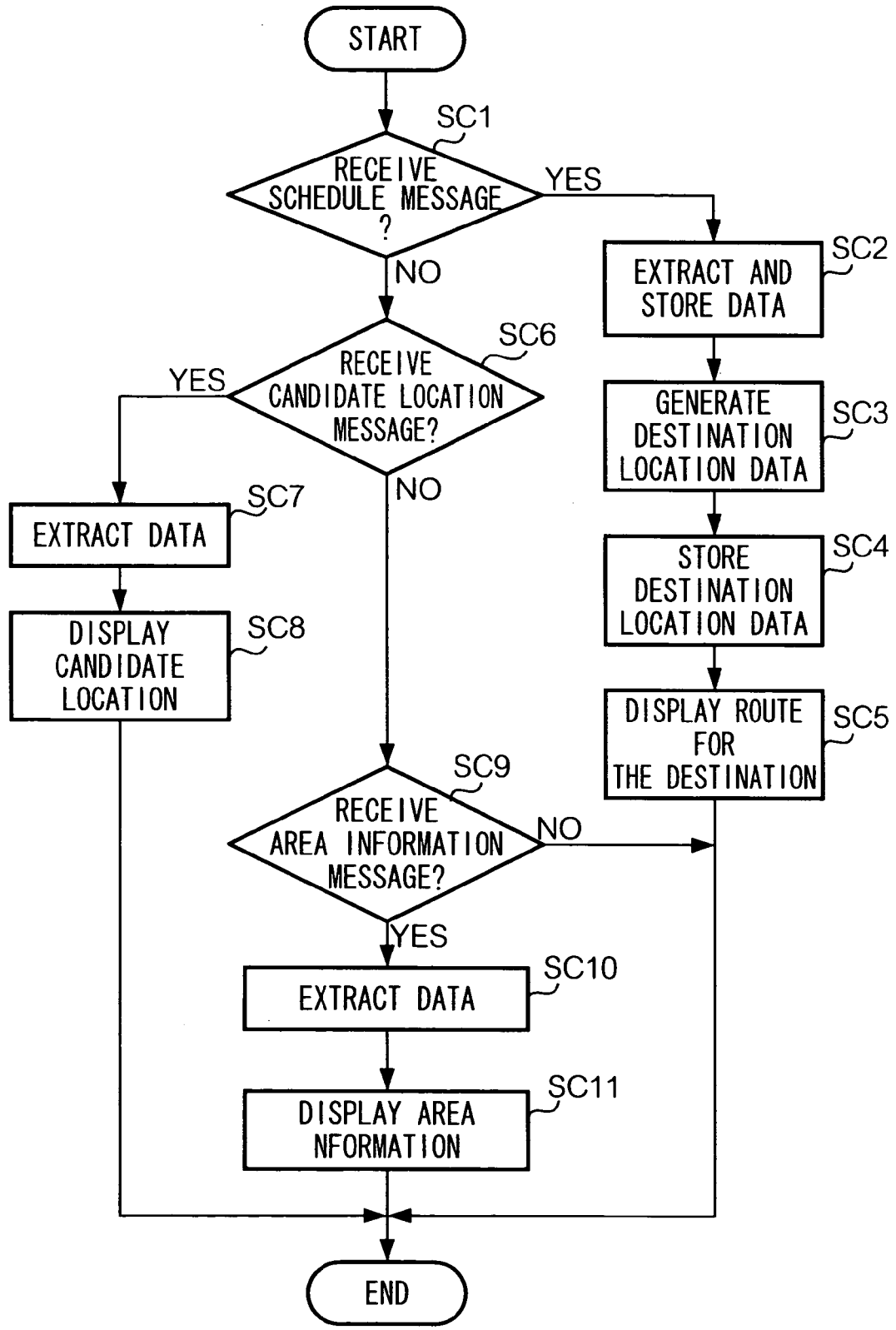
FIG. 8 is a flow chart illustrating an operation of car navigation device 600 when receiving a message.

When CPU 602 executes the schedule program, car navigation device is able to receive a message from mobile communication terminal 100. The function for receiving a message corresponds to schedule data reception unit 651 and alternative information reception unit 656 shown in FIG. 16. FIG. 8 is a flow chart illustrating an operation of car navigation device 600 when receiving a message, based on the operation of the schedule application.

If a received message is a schedule message transmitted from mobile communication terminal 100 (step SC1: YES), the operating system passes the schedule message to the schedule application. When the schedule application obtains the schedule message, the schedule application extracts the destination data, the activity data, the scheduled time data, and the alternative category data from the schedule message. Then, the schedule application stores the extracted data in storage unit 607 (step SC2). Next, the schedule application searches the location name field in location table TB1 by using the extracted destination data as a search key. If the schedule application finds a cell corresponding to the search key, the schedule application extracts latitude data and longitude data corresponding to the found cell. The schedule application generates data which includes the latitude data and the longitude data, and the data is referred to as "destination location data" (step SC3). The schedule application passes the destination location data to the car navigation application, and then the car navigation application stores the destination location data in storage unit 607 (step SC4). The car navigation application has a navigation destination set to the location indicated by the destination location data. The car navigation application calculates a route for the navigation destination and displays the calculated route on display 606, and calculates an expected time of arrival at the navigation destination at a regular time interval (step SC5). The function for calculating an expected time of arrival at the navigation destination corresponds to expected time calculation unit 653 shown in FIG. 16.

If the received message is a candidate location message (step SC6: YES), the operating system passes the message to the schedule application. The schedule application extracts the expected time data, the candidate location data, and the candidate location name data from the candidate location message (step SC7). The schedule application passes the extracted data to the car navigation application. The car navigation application displays the candidate location name and the expected time of reaching the candidate location on display 606, on the basis of the extracted data (step SC8).

If the received message is an area information message (step SC9: YES), the operating system passes the message to the schedule application. The schedule application extracts the candidate location data, the candidate location name data, and the time data from the area information data (step SC10). The schedule application passes the extracted data to the car navigation application. The car navigation application displays a screen corresponding to the extracted data on display 606 (step SC11).

Figure 9:
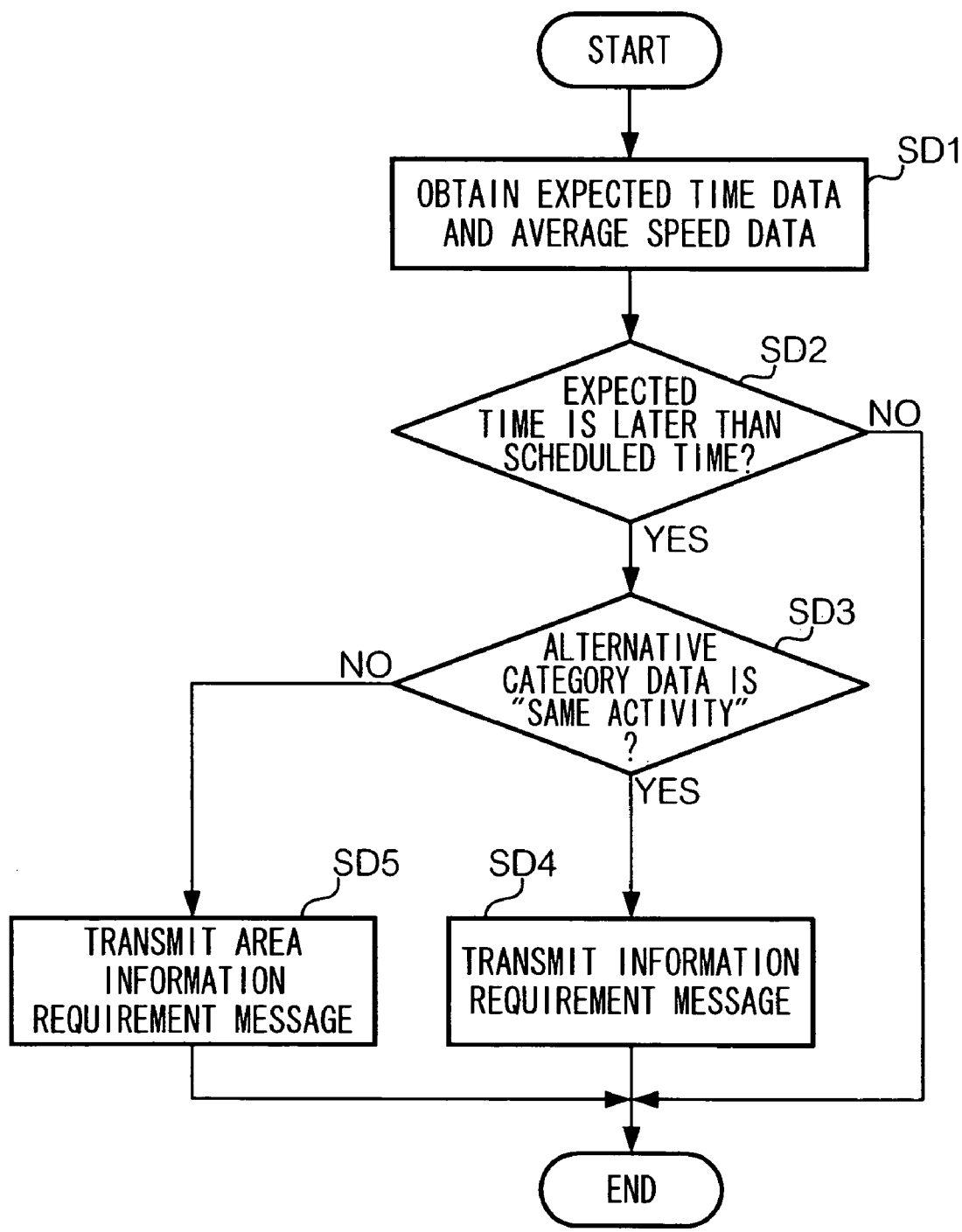
FIG. 9 is a flow chart illustrating an operation of car navigation device 600 when transmitting a message.

When the schedule application is executed by car navigation device 600, car navigation device 600 can transmit a message for requesting server apparatus 400 to provide information. FIG. 9 is a flow chart illustrating an operation of car navigation device 600 when transmitting a message to mobile communication terminal 100. Car navigation device 600 performs the operation at a regular time interval.

When the schedule application requests the car navigation application to pass the expected time data showing an expected time of reaching a destination, the car navigation application passes the expected time data and average speed data showing the average speed of car 500, to the schedule application (step SD1). The schedule application compares the expected time data with the scheduled time data, and determines whether the expected time of reaching the destination is later than the scheduled time. The function for the determination corresponds to determination unit 654 shown in FIG. 16. If it is determined that the expected time is later than the scheduled time (step SD2: YES), the schedule application transmits a message to server apparatus 400 in response to the contents of the alternative category data stored in storage unit 607. If the alternative category data shows a request for the same activity, the schedule application generates an information requirement message for requesting server 400 to provide information regarding another location where the same activity as originally scheduled can be carried out. The schedule application transmits the information requirement message to server apparatus 400 (step SD4). If the alternative category data shows a request for the present location of car 500, the schedule application generates an area information requirement message for requesting server 400 to provide information regarding the present location of car 500. The schedule application transmits the area information requirement message to sever apparatus 400 (step SD5). The function for transmitting the information requirement message and the area information requirement message corresponds to request transmission unit 655 shown in FIG. 16.

<1-5. Configuration of Server Apparatus 400>

Figure 10:
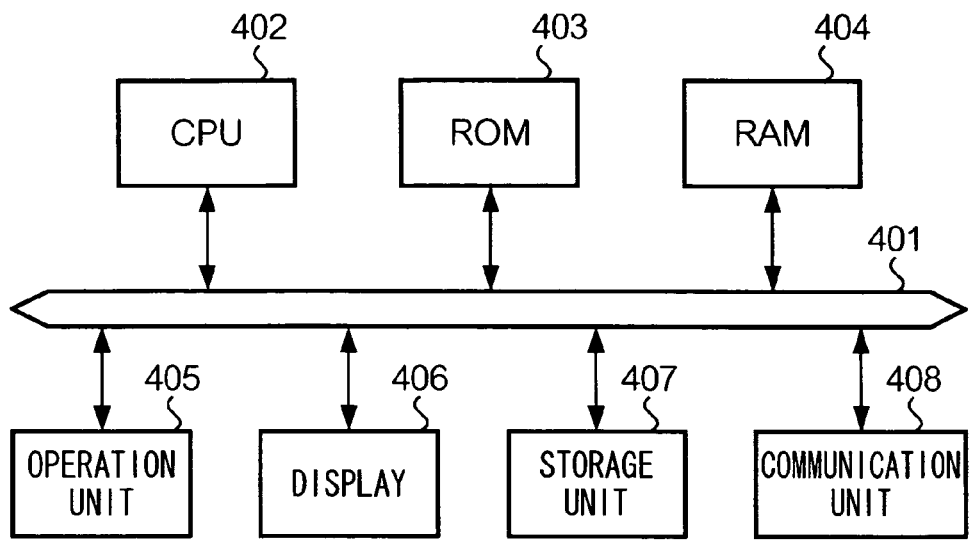
FIG. 10 is a block diagram showing a hardware configuration of server apparatus 400 in accordance with the embodiment.

FIG. 10 is a block diagram showing a hardware configuration of server apparatus 400 in accordance with the embodiment. Each unit of server apparatus 400 transmits/receives data between each other, via bus 401.

Communication unit 408 comprises a communication interface for communicating via Internet 300. Communication unit 408 receives packet data from Internet 300 and transmits the received packet data to CPU 402. Further, communication unit 408 receives packet data from CPU 402 and transmits the received packet data via Internet 300. Operation unit 405 comprises a keyboard and a mouse (both not shown in the figures). Operation unit 405 transmits a signal in response to the operation by a user of server apparatus 400. Display 406 displays characters, images, and menus for controlling server apparatus 400 under the control of CPU 402.

Storage unit 407 comprises a device for durably storing data, such as a hard disk drive (not shown in the figures). Storage unit 407 stores an information provision application and candidate location table TB2. The information provision application will be described in detail later.

Candidate location table TB2 is a table for recording information to provide mobile communication terminal 100, and records data in a format, for example, shown in FIG. 11. Candidate location field is a field for recording data showing a location name. Activity field is a field for recording data showing an activity which a user can carry out at the location corresponding to the data recorded in the candidate location name field. For example, in FIG. 11, an activity, "shopping", corresponding to a candidate location name, "souvenir shop C", shows that a user can carry out "shopping" at "souvenir shop C". Time field is a field for recording data showing the hours during which the activity can be carried out at the location. For example, in FIG. 11, hours "10:00–18:00" corresponding to a candidate location name "spa A" shows that "spa A" is open from 10:00 through 18:00. Candidate location field is a field for recording data showing the latitude and the longitude of the location corresponding to data recorded in the candidate location name field. For example, in FIG. 11, the latitude and the longitude "N35.xx.xx/E139.yy.yy" corresponding to the candidate location name "spa A" shows that the latitude and the longitude of "spa A" is 35 degrees xx minutes xx seconds north latitude and 139 degrees yy minutes yy seconds east longitude, respectively.

An operating system software for controlling all of the units of server apparatus 400, is stored in ROM 403. When power is supplied from a power supply (not shown in the figures), CPU 402 reads the operating system from ROM 403 and initiates the operating system for controlling all of the units of mobile communication terminal 100, by using RAM 404 as a work area. Thus, server apparatus 400 comprises units similar to a conventional computer device.

Figure 12:
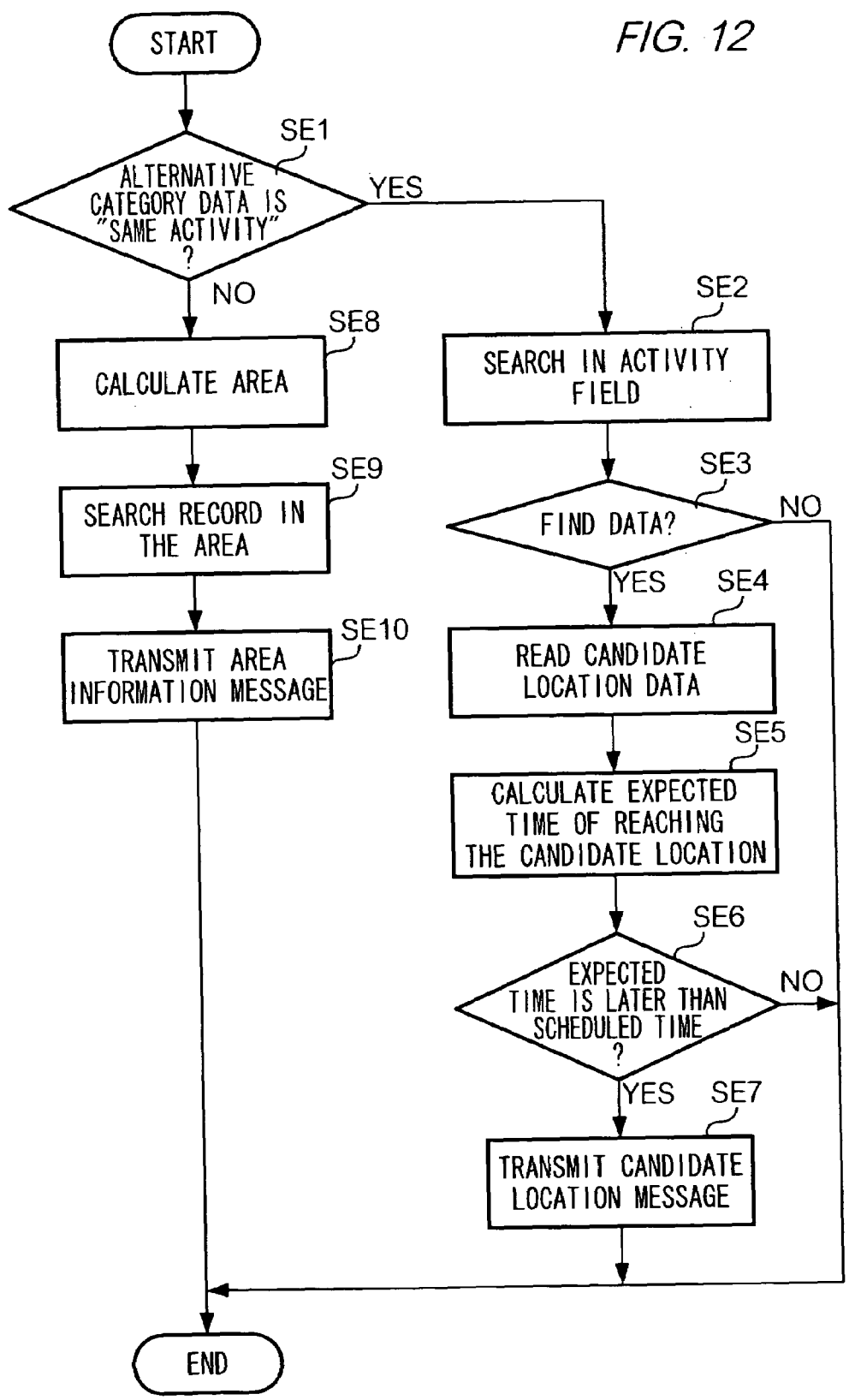
FIG. 12 is a flow chart illustrating an operation of server apparatus when receiving a message.

After initiating the operating system, CPU 402 reads and initiates the information provision application from ROM 402. When CPU 402 executes the information provision application, sever apparatus 400 can receive a message from mobile communication terminal 100, and can transmit information stored in storage unit 607, in response to the received message. The function for receiving the message from mobile communication terminal 100 corresponds to request reception unit 451. The function for providing information corresponds to alternative information transmission unit 457. FIG. 12 is a flow chart illustrating an operation when CPU402 transmits information.

If the received message is an information requirement message (step SE1; YES), first, CPU 402 extracts data included in the message. Then, CPU 402 extracts corresponding data from candidate location table TB2, on the basis of the extracted data. Then, CPU 402 calculates an expected time of reaching the extracted candidate location, and determines whether the expected time of reaching the candidate location is later than the scheduled time. Finally, CPU 402 generates a candidate location message, including information regarding another location (alternative destination) at which the user can carry out the same activity as originally scheduled. CPU 402 transmits the candidate location message to mobile communication terminal 100 (step SE7). The function for extracting data corresponding to the alternative destination corresponds to extraction unit 453 shown in FIG. 16. The function for calculating an expected time of reaching the candidate location corresponds to expected time calculation unit 454. The function for the determination corresponds to determination unit 456.

If the received message is an area information requirement message (step SE1: NO), first, CPU 402 extracts from the information requirement message. Then, CPU 402 extracts corresponding data from candidate location table TB2, on the basis of the extracted data. Finally, CPU 402 generates an area information message regarding the alternative destination, namely, information regarding the area including the present location of car 500, to change the schedule of the user (step SE10).

<2. Operation>

The operation of the embodiment will be described in this section, according to the following order. First, the operation of the driver of car 500 inputting data showing his/her schedule into car navigation device 600, will be described. Second, the operations of the car navigation device 600 obtaining information regarding another location at which the user can carry out the same activity as originally scheduled, and the car navigation device 600 obtaining information regarding the area, including the present location of car 500, the instance that the user has to cancel his/her original schedule, will be described.

In the following description, the information provision application has already been initiated in server apparatus 400. Also, the car navigation application and the schedule application have already been initiated in car navigation device 600.

<2-1. Operation for Storing Schedule Data in Car Navigation Device 600>

Figure 13:
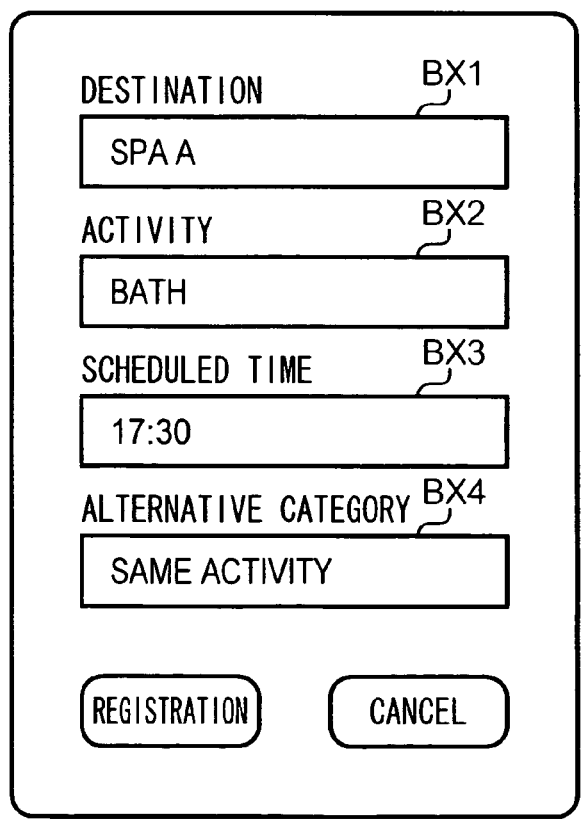
FIG. 13 shows an example of an image displayed on a display unit of mobile communication terminal 100 in accordance with the embodiment.

When the driver operates keypad 105 of mobile communication terminal 100 to instruct the execution of the schedule registration application stored in storage unit 107, CPU 102 reads and initiates the schedule registration application from storage unit 107. When the schedule registration application is initiated, CPU 102 displays a screen for prompting a user to input information, for example, as shown in FIG. 4, on display 106 under the control of CPU 102. The user of mobile communication terminal 100 inputs character strings, for example, as shown in FIG. 13. When the user of mobile communication terminal 100 operates keypad 106 to click the "registration" button in the screen (step SA9 in FIG. 3: YES, step SA10: YES), CPU 102 extracts the character strings inputted in the text boxes and stores the extracted character strings in RAM 104. Then, CPU 102 generates a schedule message which includes the destination data, the activity data, the scheduled time data, and the alternative category data. In the embodiment, destination data, activity data, scheduled time data, and alternative category data are "spa A", "bath", "17:30", and "the same activity", respectively. CPU 102 transmits the schedule message to car navigation device 600 via short range wireless communication unit 109 (step SA11). The schedule message is received by short range wireless communication unit 609 in car navigation device 600.

When car navigation device receives the schedule message, the operating system in car navigation system 600 passes the schedule message to the schedule application (step SC1 in FIG. 8: YES). The schedule application extracts the destination data, the activity data, the scheduled time data, and the alternative category data from the schedule message and stores the extracted data in storage unit 607 (step SC2). The schedule application searches the "location name" field of location table TB1 by using the content of the extracted activity data as a search key. If CPU 602 finds in location table TB1 a cell corresponding to the search key, CPU 602 extracts the latitude data "N35.xx.xx" and the longitude data "E139.yy.yy" corresponding to the found cell. Then, CPU 602 generates destination location data, which includes the extracted latitude data and longitude data (step SC3).

The schedule application passes the destination location data to the car navigation application. The car navigation application stores the destination location data in storage unit 607 (step SC4). The car navigation application has a navigation destination set to the location indicated by the destination location data. The car navigation application calculates a route to the navigation destination and displays the calculated route on display 606, and calculates an expected time of reaching the navigation destination at a regular time interval (step SC5).

<2-2. Operation for Obtaining and Displaying Candidate Location Information>

Now, an operation carried out, in a case that the driver is not able to reach the destination by the scheduled time, will be described. In this section, an operation, in a case that the driver sets the alternative category data to "the same activity", for obtaining information regarding another location at which the driver can carry out the same activity as originally scheduled, will be described. The data showing the schedule of the driver has already been stored in car navigation device 600 in accordance with the operation described above. In the following description, the schedule application obtains "18:00" as the expected time data and "15 km/h" as the average speed data.

When the schedule application receives the expected time data "18:00" and the average speed data "15 km/h" from the car navigation application (step SD1 in FIG. 9), the schedule application determines whether the expected time is later than the scheduled time by comparing the expected time data and the scheduled time data. In the embodiment, CPU 602 determines that the expected time is later than the scheduled time (step SD2: YES), because the expected time and the scheduled time are "18:00" and "17:30", respectively. Then, CPU 602 reads the alternative category data stored in storage unit 607. Because the alternative category data is "the same activity" in the embodiment (step SD3: YES), CPU 602 reads the activity data, the scheduled time data, and the alternative category data from storage unit 607. CPU 602 generates an information requirement message which includes the activity data, the scheduled time data, the alternative category data, the average speed data, and the present location data obtained from the GPS unit.

Figure 14:
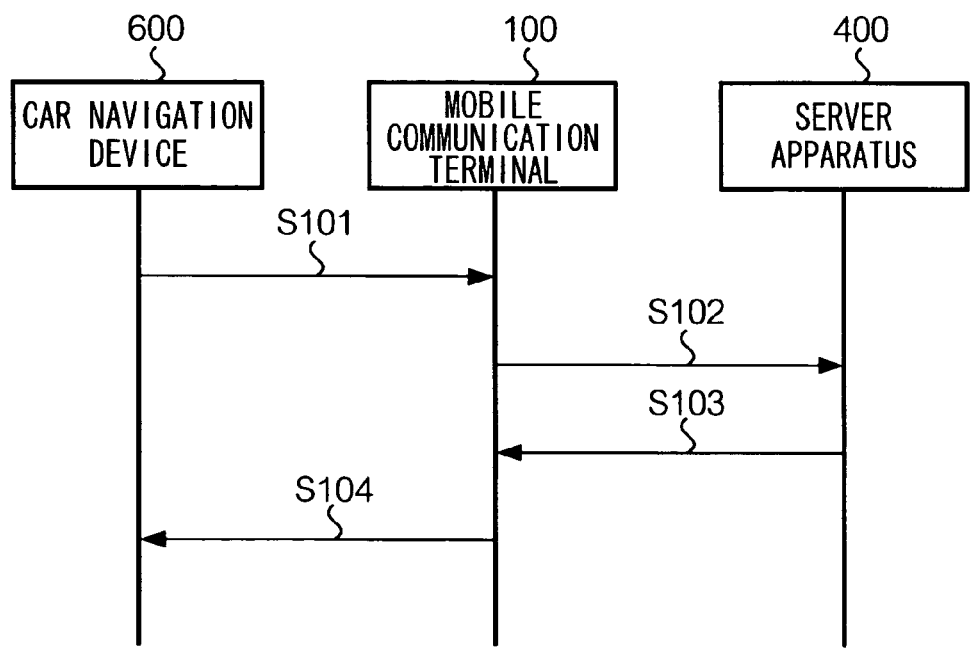
FIG. 14 illustrates an operation in accordance with the embodiment.

The information requirement message is transmitted via short range wireless communication unit 609 (step SD4 in FIG. 9 and step S101 in FIG. 14). Mobile communication terminal 100 receives the information requirement message via short range wireless communication unit 109, and the information requirement message is transmitted to CPU 102. When CPU 102 receives the information requirement message (step SB1 in FIG. 5: YES), CPU 102 adds the IP address allocated to mobile communication terminal 100, to the information requirement message. Then, CPU 102 transmits the information requirement message to server apparatus 400 via communication unit 108 (step SB3 in FIG. 5 and step S102 in FIG. 14). The information requirement message is received by a wireless base station in mobile packet communication network 200, then transmitted to server 400 via mobile packet communication network 200 and Internet 300, and finally received by communication unit 408 in server apparatus 400.

Communication unit 408 transmits the received information requirement message to CPU 402. CPU 402 extracts the IP address, the alternative category data, the activity data, the present location data, the scheduled time data, and the average speed data from the information requirement message. Because the extracted alternative category data is "the same activity" in the embodiment (step SE1 in FIG. 12: YES), CPU 402 in accordance with the below mentioned procedure, searches information regarding another location at which the driver can carry out the same activity as originally scheduled.

First, CPU 402 searches the activity field of candidate location table TB2 by using the extracted activity data "bath" as a search key (step SE2). CPU 402 finds a cell corresponding to the search key, for example, the cell whose record number is "2" in FIG. 11 (step SE3; YES). CPU 402 reads the location data corresponding to the found cell (step SE4). CPU 402 calculates the distance, for example, "3 km", from the present location of car 500 to the candidate location by using the location data and the present location data extracted from the information requirement message.

Then, CPU 402 calculates a time necessary to reach the candidate location as 12 minutes, on the basis of the calculated distance "3 km" and the average speed rate of "15 km/h" extracted from the information requirement message. CPU 402 calculates the expected time of reaching the candidate location as "17:12" on the basis of the present time and the calculated time necessary to reach the candidate location (step SE5). The calculated expected time "17:12" is not later than the scheduled time "17:30" indicated by the scheduled time data extracted from the information requirement message (step SE6: YES). Therefore, CPU 402 extracts the available time data "9:30–21:00" corresponding to the found cell, from candidate location table TB2. CPU 402 determines whether the calculated expected time is within the available time period corresponding to the available time data. In the embodiment, CPU 402 determines that the driver can carry out the activity in the candidate location at the expected time because the calculated expected time is within the available time period corresponding to the available time data. Then, CPU 402 generates a candidate location message, which includes the expected time data showing the expected time, the candidate location data used for calculating the expected time, the candidate location name data corresponding to the candidate location data.

In a case that a plurality of candidate locations are found by searching in candidate location table TB2, one of the plurality of candidate locations may be selected and the information requirement message may include data corresponding to the selected one candidate location. Various methods can be available for selecting one candidate location. For example, the most nearest candidate location from the present location may be selected on the basis of the location data and present location data. Alternatively, priority data showing the priority of the corresponding candidate location may be recorded in candidate location data, and the one candidate location may be selected on the basis of the priority data.

CPU 402 transmits the candidate location message whose destination address is set to the IP address extracted from the information requirement message, to mobile communication terminal 100 via communication unit 408 (step SE7 in FIG. 12 and step S103 in FIG. 14). The candidate location message is received by communication unit 108 in mobile communication terminal 100, and is transmitted to CPU 102. When the candidate location message is provided, CPU 102 transmits the candidate location message to car navigation device 600 via short range wireless communication unit 109 (step SB6 in FIG. 5 and step S104 in FIG. 14).

The candidate location message is received by short range wireless communication unit 609 in car navigation device 600 and transmitted to CPU 602. Then, the operating system passes the candidate location message to the schedule application (step SC6 in FIG. 8: YES). The schedule application extracts the expected time data, the candidate location data, and the candidate location name data from the candidate location message (step SC7), and passes the extracted data to the car navigation application. The car navigation application displays a character indicating the candidate location, the candidate location name, and the expected time of reaching the candidate location (step SC8).

As described in this section, according to the embodiment, the information regarding another location at which the driver can the scheduled activity is displayed on display 606 of car navigation device 600 when the driver is not able to reach the originally scheduled destination by the scheduled time. Therefore, the driver can carry out the scheduled activity at a different location when the driver is not able to reach the originally scheduled destination by the scheduled time. Additionally, according to the embodiment, the service available time at the candidate location, as well as the candidate location name is displayed. Thus, the present system provides a convenient method for the driver to determine whether or not to change his/her schedule and go to the candidate location.

<2-3. Operation for Obtaining and Displaying Area Information on Car Navigation Device 600>

Figure 15:
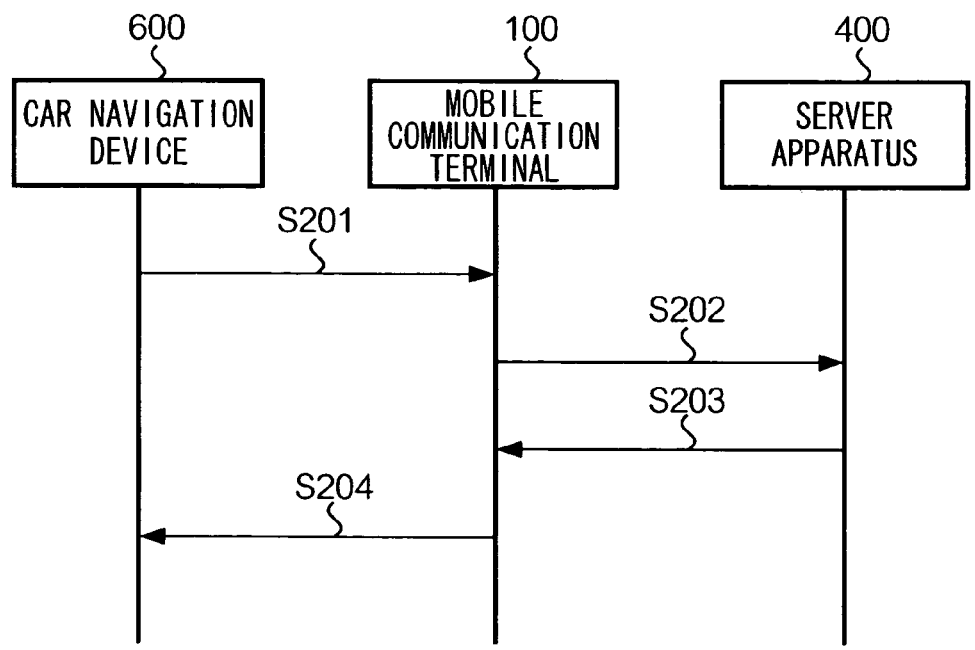
FIG. 15 illustrates an operation in accordance with the embodiment.

In this section, an operation to be carried out, in a case that the driver sets the alternative category data to "area" for obtaining area information regarding the present location of car 500, will be described with reference to FIG. 15. The operations of the driver instructing the initiation of the schedule registration application into that of the schedule application, and of determining that the expected time is later than the scheduled time, are similar to the operations described in the previous section with the exception that the alternative category data is "area" in this section. Therefore, descriptions of the operations are omitted in this section.

When the schedule application determines that the expected time is later than the scheduled time (step SD2 in FIG. 9: YES), the schedule application reads the alternative category data from storage unit 607. Because the alternative category data shows "area" in the embodiment (step SD3: NO), the schedule application generates an area information requirement message, which includes the alternative category data and the present location data received from the GPS unit.

The area information requirement message is transmitted from car navigation device 600 (step SD5 in FIG. 9 and step S201 in FIG. 15) to server apparatus 400 via mobile communication terminal 100, mobile packet communication terminal 200, and Internet 300. Communication unit 408 in server apparatus 400 receives the area information requirement message (step S202).

Communication unit 408 transmits the received area information requirement message to CPU 402. CPU 402 extracts the IP address, the alternative category data, the activity data, the present location data, the scheduled time data, and the average speed data from the area information requirement message. Because the extracted alternative category data shows "area" in the embodiment (step SE1 in FIG. 12: NO), CPU 402 searches area information regarding the present location of car 500, in accordance with the following procedure.

First, CPU 402 calculates latitudes of two points which are at a predetermined distance (for example, 10 km) away from the present location toward north and south, respectively. CPU 402 also calculates longitudes of two points which are at a predetermined distance (for example, 10 km) away from the present location toward east and west, respectively (step SE8). Then, CPU 402 searches the candidate location field of candidate location table TB2 for data corresponding to a location within the area defined by the two calculated latitudes and longitudes (step SE9). In the embodiment, CPU 402 finds a cell whose record number is "3", and extracts the candidate location name, "souvenir shop C", the candidate location data "N35.vv.vv/E139.vv.vv", and available time data "9:00–19:00" from candidate location table TB2. CPU 402 generates an area information message which includes the extracted data.

The area information message is transmitted from server apparatus 400 (step SE10 in FIG. 12 and step S203 in FIG. 15) to car navigation device 600 via Internet 300, mobile packet communication network 200, and mobile communication terminal 100 (step S204), similar to the candidate location message described above.

Short range wireless communication unit 609 receives the area information message and transmits the area information message to CPU 602. The operating system passes the area information message to the schedule application (step SC9 in FIG. 8: YES). The schedule application extracts the candidate location data, the candidate location name data, and the available time data from the area information message (step SC10), and passes the extracted data to the car navigation application. The car navigation application displays characters indicating the candidate location, the hours during which the candidate location is available, and the candidate location name on display 606, on the basis of the extracted data (step SC11).

As described in this section, according to the embodiment, the area information regarding the present location of car 500 is displayed on display 606 of car navigation device 600 when the driver is not able to reach the originally scheduled destination by the scheduled time. Therefore, the driver is able to easily change his/her schedule on the basis of the displayed information.

According to a system disclosed in the prior art, JP 2002-92785A, information regarding the destination in relation to the expected time of reaching the destination, is displayed when the expected time is updated, but the information does not indicate in any way, whether it is possible to carry out the scheduled activity at the destination. Therefore, the driver must first read all of the displayed information to determine whether he/she can carry out the scheduled activity at the destination at the scheduled time. It is difficult for the driver to read the display of the car navigation device while driving, as the displayed information does not indicate a determination. On the contrary, according to the preferred embodiment of the present invention, information is obtained from server apparatus 400 and transmitted to car navigation device 600 and when car navigation device 600 determines that the driver cannot reach the originally scheduled destination by the scheduled time, the determination is displayed on display 606 of car navigation device 600. Therefore, the driver is able to easily determine that he/she cannot carry out the scheduled activity at the destination, at the scheduled time without having to go through information in order to determine.

Additionally, the system described in the preferred embodiment of the present invention is safer to use while driving than the system of the prior art, because the driver of a vehicle is able to obtain conclusive information without operating a device. The above described advantage of the system of the present embodiment is due to the fact that information is obtained on the basis of a determination of whether or not, the driver is able to carry out the scheduled activity at the destination at the scheduled time.

<3. Modifications>

The present invention is not restricted to the embodiment described above, and various modifications are possible. Following are examples of the modifications.

In the embodiment, a device which obtains information from server apparatus 400 is described as car navigation device 600. However, the device is not restricted to the car navigation device. In the present invention, a device which comprises location measurement means and navigation means may be used as a device for obtaining information from server apparatus 400. For example, a PDA (Personal Data Assistance), a mobile personal computer, or a mobile phone comprising hardware for GPS and software for navigation, may be used for obtaining and displaying information, instead of car navigation device 600 of the above embodiment.

The schedule data is inputted into car navigation device 600 via mobile communication terminal 100 in the above embodiment, but the schedule data may be directly inputted into car navigation device 600 by operating keypad 605. Additionally, the scheduled time inputted as the scheduled time data may be the time at which the driver is scheduled to begin the activity.

The communication between mobile communication terminal 100 and a server apparatus may be in conformity with HTTP (HyperText Transfer Protocol). Additionally, server apparatus 400 may provide information by using CGI (Common Gateway Interface).

The schedule application, the car navigation application, or the schedule registration application may be downloaded from a server apparatus connected to Internet 300, and may be installed into mobile communication terminal 100 or car navigation device 600. Alternatively, these applications may be stored in a storage medium available for a computer system, and may be installed from the storage medium into mobile communication terminal 100 or car navigation device 600.

In the above embodiment, car navigation device 600 executes two applications, the schedule application and the car navigation application. However, the functions of the schedule application and the car navigation application may be integrated into a single application, and car navigation device may execute the single application.

In the above embodiment, server apparatus 400 provides data showing hours during which a service is available at a location, but the data content is not restricted to this. Data provided from server apparatus 400 may include information such as, the availability or non-availability of parking, the available goods in a case that the destination is a shop, or the presence or absence of a rest room, or other various information.

The functional configuration of car navigation device 600, mobile communication terminal 100, and server apparatus 100 are not restricted to that described in the above embodiment. For example, car navigation device 600 may comprise a communication interface capable of packet communication, and may communicate with server apparatus 400 without mobile communication terminal 100. Alternatively, mobile communication terminal may comprise functions of car navigation device such as a GPS receiver or car navigation application software. According to this configuration, mobile communication terminal 100 can perform car navigation and display information regarding a candidate location. Further alternatively, car navigation device may store candidate location table TB2 which is stored in server apparatus 400 in the above embodiment. According to this configuration, car navigation device 600 can search candidate location by itself.

In the above embodiment, a location name is inputted as destination data for indicating the destination of the navigation, but the destination data is not restricted to that described in the embodiment. The latitude and the longitude of the location instead of the location name may be inputted as destination data. The schedule application may pass the destination data showing the latitude and the longitude of the location, to the car navigation application. The car navigation application may have the destination set to the location indicated by the destination data showing the latitude and the longitude of the location.

The method for calculating the expected time of reaching the destination by server apparatus 400 is not restricted to that described in the above embodiment. The server apparatus may calculate the expected time of reaching the destination, on the basis of various types of information, for example, traffic information regarding a traffic jam, a traffic accident, or a speed limit.

In the above embodiment, the schedule application generates different messages depending on the content of the alternative category data. The functions of the schedule application may be divided into two applications, one of which is an application for obtaining information regarding another location at which the driver can carry out the same activity as originally scheduled; and the other of which is an application for obtaining area information. In this case, the latter application for obtaining area information may not receive the information corresponding to the activity when receiving area information, because the information corresponding to the activity is not necessary for the latter application. Furthermore, the latter application for obtaining area information may not display the text box for the activity data when the screen for prompting a user to input his/her schedule is displayed on mobile communication terminal 100.

The application for transmitting the schedule data from mobile communication terminal 100 to car navigation device 600 is not restricted to the schedule registration application. Any other application may comprise a function for transmitting the schedule data from mobile communication terminal 100 to car navigation device 600.

The invention claimed is:

1. An information provision system having a terminal device and a server apparatus, the terminal device being capable of measuring its location, the server apparatus being capable of communicating with the terminal device, wherein:

the terminal device comprises storage means for storing a plurality of destination data, the destination data including destination location data and destination attribute data, the destination location data showing a geographic location of a location, the destination attribute data showing an attribute of the location, the attribute data corresponding to the destination location data;

the terminal device further comprises reception means for receiving (a) present location data, (b) destination identification data, (c) scheduled time data, and (d) search scope indication data, the present location data showing a present location of the terminal device, the destination identification data identifying a location as a destination, the scheduled time data showing an expected time of reaching the destination, the search scope indication data indicating a scope of search;

the terminal device further comprises first calculation means for calculating an expected time of reaching the destination on the basis of the present location data and the destination location data corresponding to the destination identification data;

the terminal device further comprises first determination means for determining whether or not arrival at the destination by the scheduled time is possible, on the basis of the scheduled time data and an expected time of reaching the destination;

the terminal device further comprises schedule transmission means for transmitting the search scope indication data, the scheduled time data, and the present location data, to the server apparatus in a case that the result of the determination by the first determination means is negative;

the server apparatus comprises storage means for storing a plurality of candidate data, the candidate data including candidate location data and a plurality of attribute data, the candidate location data showing location information of a candidate location, and each of the plurality of attribute data showing an attribute of the candidate location;

the server apparatus further comprises reception means for receiving search scope indication data, scheduled time data, and present location data, the search scope indication data showing a scope of search for a plurality of candidate location data;

the server apparatus further comprises extraction means for extracting one attribute data from the plurality of attribute data, the extracted attribute data being included in the scope of search indicated by the search scope indication data;

the server apparatus further comprises second calculation means for calculating an expected time of reaching the candidate location on the basis of the present location data and candidate location data corresponding to the extracted attribute data;

the server apparatus further comprises second determination means for determining whether arrival at the candidate location by the expected time is possible, on the basis of the expected time and the scheduled time data;

the server apparatus further comprises transmission means for transmitting all or part of the candidate data including the extracted attribute data in a case that the result of the determination by the determination means is negative; and the terminal device further comprises display means for displaying a screen on the basis of all or a part of the candidate data transmitted by the transmission means.

\* \* \* \* \*